United States Patent
Tobita et al.

[11] Patent Number: 5,812,512
[45] Date of Patent: Sep. 22, 1998

[54] DATA REPRODUCING APPARATUS WHICH PROHIBITS ILLEGITIMATE ACCESS TO DATA USING AN INTERNAL ID

[75] Inventors: Minoru Tobita, Tokyo; Takeshi Funahashi, Saitama, both of Japan

[73] Assignee: Sony Corporation, Tokyo, Japan

[21] Appl. No.: 661,304

[22] Filed: Jun. 13, 1996

Related U.S. Application Data

[63] Continuation of Ser. No. 290,233, Aug. 15, 1994, abandoned.

[30] Foreign Application Priority Data

Aug. 17, 1993 [JP] Japan .................................. 5-225246
Aug. 31, 1993 [JP] Japan .................................. 5-238940

[51] Int. Cl.⁶ .................................................. G11B 7/00
[52] U.S. Cl. ................................ 369/84; 369/32; 369/60
[58] Field of Search ................................ 369/52, 48, 54, 369/58, 32; 360/60, 53; 380/2, 3, 4, 5

[56] References Cited

U.S. PATENT DOCUMENTS

| | | | |
|---|---|---|---|
| 4,814,903 | 3/1989 | Kulakowski et al. | 360/48 |
| 4,833,665 | 5/1989 | Tokumitsu et al. | 369/58 |
| 4,866,769 | 9/1989 | Karp | 360/60 |
| 4,879,704 | 11/1989 | Takagi et al. | 369/59 |
| 4,885,735 | 12/1989 | Fukushima et al. | 369/59 |
| 4,939,598 | 7/1990 | Kulakowski et al. | 360/48 |
| 5,379,433 | 1/1995 | Yamagishi | 360/60 |
| 5,418,852 | 5/1995 | Hami et al. | 360/60 |
| 5,428,598 | 6/1995 | Veldhuis et al. | 369/275.3 |
| 5,432,647 | 7/1995 | Tateishi | 360/60 |
| 5,453,968 | 9/1995 | Veldhuis et al. | 369/84 |
| 5,461,220 | 10/1995 | Osino | 369/59 |

FOREIGN PATENT DOCUMENTS

| | | |
|---|---|---|
| 0464320 A3 | 1/1992 | European Pat. Off. . |
| 0501508 A3 | 9/1992 | European Pat. Off. . |
| 2123597 | 2/1984 | United Kingdom . |

*Primary Examiner*—Nabil Hindi
*Attorney, Agent, or Firm*—Limbach & Limbach L.L.P.

[57] ABSTRACT

A disc driving apparatus for driving a disc recording medium on which a plurality of sets of user data and a plurality of unique data, each of which is related to each set of the user data, are recorded, and including a reproducing circuit for reproducing the unique data and the user data recorded on the disc recording medium, an error correction circuit for correcting errors in the data reproduced by the reproducing circuit and detecting an error rate of the data reproduced by the reproducing circuit, and a data replacement circuit for recording the unique data which is error-corrected by the error correction circuit in a replacement area of the disc recording medium when the error rate of the unique data is higher than a first reference error rate and for recording the user data which is error-corrected by the error correction circuit in the replacement area of the disc recording medium when the error rate of the user data is higher than a second reference error rate which second reference error rate is different from the first reference error rate.

5 Claims, 7 Drawing Sheets

| D0 | D1 | D2 | D3 | D4 |
|------|------|------|------|------|
| D5 | D6 | D7 | D8 | D9 |
| ≈ | ≈ | ≈ | ≈ | ≈ |
| D510 | D511 | VU1 | VU2 | VU3 |
| VU4 | CRC1 | CRC2 | CRC3 | CRC4 |
| E1,1 | E2,1 | E3,1 | E4,1 | E5,1 |
| ≈ | ≈ | ≈ | ≈ | ≈ |
| E1,15 | E2,15 | E3,15 | E4,15 | E5,15 |
| E1,16 | E2,16 | E3,16 | E4,16 | E5,16 |

FIG. 2

DATA REPRODUCING APPARATUS WHICH PROHIBITS ILLEGITIMATE ACCESS TO DATA USING AN INTERNAL ID

This is a continuation of application Ser. No. 08/290,233 filed on Aug. 15, 1994 now abandoned.

BACKGROUND OF THE INVENTION

1. Field of the Invention

This invention relates to a data reproducing apparatus, and more particularly to an improvement of optical disc device which is utilized as an auxiliary memory unit for a computer.

2. Description of the Related Art

Heretofore, there is an optical disc device which is used as an auxiliary memory unit for a computer, etc.

In this optical disc device, there are optical disc devices for reproducing only which use-read-only optical discs and optical disc devices which use writable optical discs, such as magnetic optical discs and the like.

In these types of optical, disc devices, the content of an optical disc can be copied easily. Thus, a problem occurs regarding the protection of a copyrighted data.

Also, data representing the data structure of disc, DDS (Disc Definition Structure), is recorded in the optical disc. For example, the information for sector interchange-processing, etc. is recorded in the DDS.

The DDS is such important data as to be recorded twice each in the innermost and the outermost of an optical disc. If one DDS becomes impossible to error correct, the data structure can be obtained from another DDS recorded in another area.

However, even though the DDS is recorded four times, it may prove to be insufficient in some cases. This is a problem in that the optical disc can not be used when all DDS become impossible to error correct.

SUMMARY OF THE INVENTION

In view of the foregoing, an object of this invention is to provide a data reproducing apparatus for solving the above problems.

More specifically, this invention provides a driving apparatus for driving a disc recording medium on which a plurality of sets of user data and a plurality of unique data, each of which is related to each set of the user data, are recorded. The disc driving apparatus comprises reproducing means for reproducing the unique data and the user data recorded on the disc recording medium, error correction means for correcting errors in the data reproduced by the reproducing means and detecting an error rate of the data reproduced by the reproducing means, and data replacement means for recording the unique data which is error-corrected by the error correction means in a replacement area of the disc recording medium when the error rate of the unique data is higher than a first reference error rate and for recording the user data which is error-corrected by the error correction means in the replacement area of the disc recording medium when the error rate of the user data is higher than a second reference error rate which second reference error rate is different from the first reference error rate. In the preferred embodiment the first reference error rate is less than the second reference error rate.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 2 is a schematic diagram explaining a sector format of the optical disc which is used in this invention;

DETAILED DESCRIPTION OF THE EMBODIMENT

Figure 1:
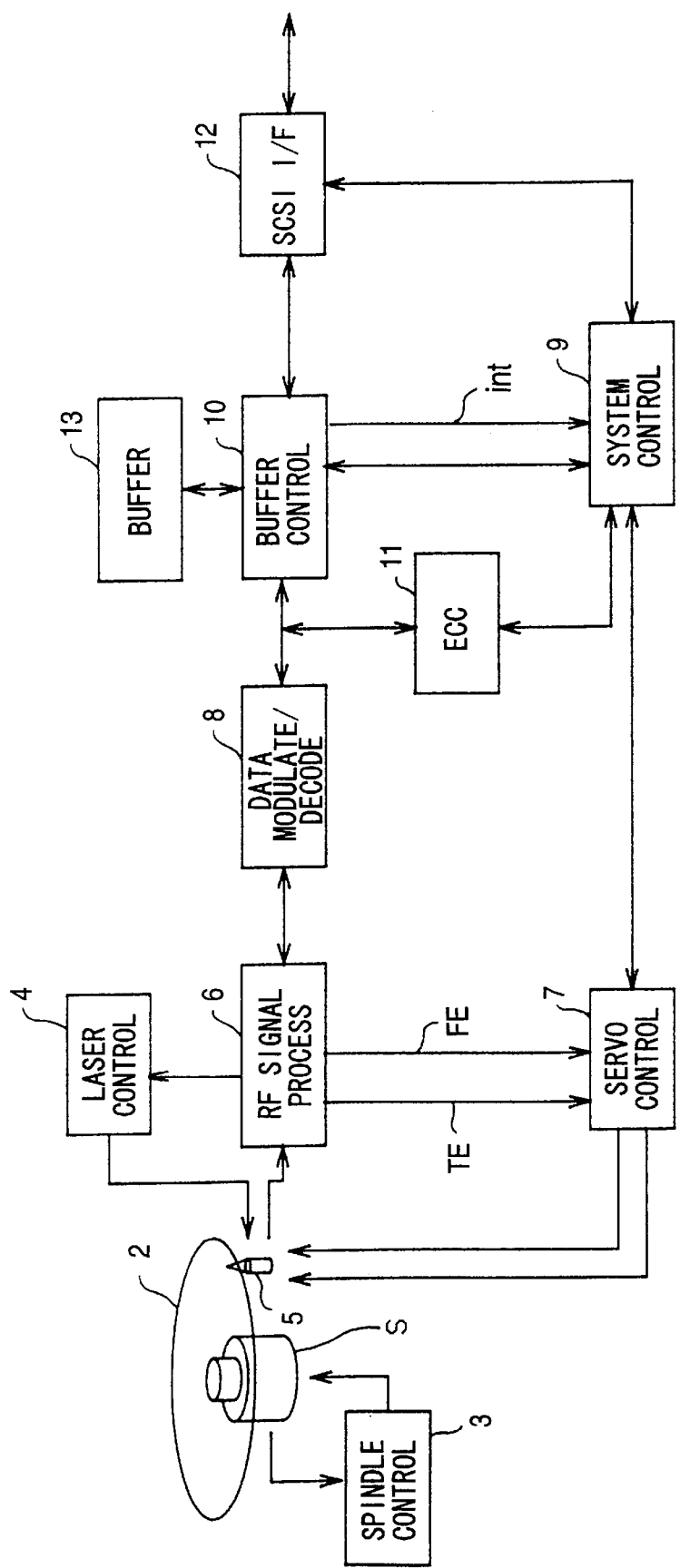
FIG. 1 is a block diagram showing the whole construction of an optical disk device according to this invention.

Preferred embodiments of this invention will be described with reference to the accompanying drawings:

In FIG. 1, 1 denotes an optical disc device, which records and/or reproduces the desired data by utilizing an optical disc 2 capable of recording and/or reproducing, and also reproduces the desired data from a reproduction only optical disc 2.

In this optical disc device 1, an optical-magnetic disc which is able to record and/or reproduce the desired data by applying the thermomagnetic recording scheme and a ROM (read only memory) disc for reproduction which has been produced by applying the same scheme as the compact disc, are applicable.

A spindle motor S is driven by a spindle motor control circuit 3, so that an optical disc 2 is rotated with a predetermined rotating speed.

In this state, a laser control circuit 4 is caused to project a light beam from an optical pick-up 5 to the optical disc 2, by driving a laser diode which is included in the optical pick-up 5.

The optical pick-up 5 receives a reflected light of this light beam on the light-receiving element, and then outputs the result of the light-receiving to an RF signal processing circuit 6.

The RF signal processing circuit 6 performs a current-voltage transforming process of this result of the light-receiving and then performs an add-subtract processing at the stated matrix circuit, in order to generate a tracking error signal TE and a focus error signal FE, and then outputs the tracking error signal TE and the focus error signal FE to a servo control circuit 7.

The servo control circuit 7 positions the optical pick-up 5 and an object lens which is included in the optical pick-up 5, based on the tracking error signal TE and the focus error signal FE, so as to perform tracking control and a focus control.

In addition, the servo control circuit 7 causes the optical pick-up 5 to seek in the radial direction of the optical disc, in response to a control command which is output from a system control circuit 9, so as to access the optical disc 2.

Further, the RF signal processing circuit 6 generates a reproduced sum signal in which the signal level changes in accordance with a quantity of light of the reflected light, and a reproduced difference signal in which the signal level changes in accordance with a change of the polarization surface of the reflected light, respectively.

In the case where the optical disc 2 is a ROM disc by performing a binarization of the sum signal and then processing it in the succeeding data modulating and decoding circuit 8, the optical disc device 1 reproduces the desired data, and also detects a logical address of the reproducing position (that is composed of a physical address).

Meanwhile, in the case where the optical disc 2 is an optical-magnetic disc, by performing a binarization of the difference signal and then processing it in the succeeding data modulating and decoding circuit 8, the optical disc device 1 reproduces the desired data. In addition, by taking the sum signal at the specified period and processing it, the logical address of the recording and/or reproducing position is detected.

In this way, the system control circuit 9 makes the optical pick-up 5 to seek, by issuing a control code to the servo control circuit 7 on the basis of thus detected logical address.

The data modulating and decoding circuit 8 obtains the reproduced data by performing a binarization of the reproduced signal output from the RF signal processing circuit 6, performs a 7-2 demodulation and outputs the reproduced data to a buffer control circuit 10.

At this time, an error detecting and correcting circuit (ECC) 11 performs an error correcting process on the reproducing data, utilizing an error detecting and correcting code which is reproduced along with the reproduced data.

The error detecting and correcting circuit 11 outputs the result of the error correction to the system control circuit 9. The system control circuit 9 then determines whether the desired data has been correctly reproduced or not, and issues a control code, if necessary, so as to repeat the reproducing operation.

Further, if any error has occurred in the reproducing data, the system control circuit 9 issues an error code, which represents that an error has occurred, to a host computer by sending an interrupt through a SCSI (small computer system interface) interface circuit (I/F) 12.

The buffer control circuit 10 sequentially inputs and stores the reproduced data into a buffer memory 13, and then outputs the reproduced data which has been stored in the buffer memory 13 to the host computer, at a predetermined times, through the SCSI interface circuit 12.

The system control circuit 9 executes this sequential reproducing process by controlling the entire system operation in response to the control command which is issued from the host computer via the SCSI interface circuit 12. In such a manner, the optical disc device 1 is able to output a mass of data to the host computer as an auxiliary storage unit for a computer.

Meanwhile, when the optical disc 2 is an optical-magnetic disc if a write control command is issued from the host computer, then the system control circuit 9 switches the operation mode to a recording mode.

The buffer control circuit 10 stores the input data which is input via the SCSI interface circuit 12 into the buffer memory 13 and outputs it to the data modulating and decoding circuit 8 at a predetermined timing.

At this time, the error detecting and correcting circuit 11 generates an error detecting and correcting code for this input data and then outputs it to the data modulating and decoding circuit 8 and the data modulating and decoding circuit 8 performs 2-7 modulation of both the input data and the error detecting and correcting code in order to transform it into the recording data.

The RF signal processing circuit 6 forms a reference clock for recording based on the reproduced result composed of the sum signal, and outputs this reference clock to the laser control circuit 4.

The laser control circuit 4 drives the optical pick-up 5 in synchronization with this reference clock, switches the light beam to the laser power at recording, and projects the light beam intermittently.

Further, a modulating magnetic field is impressed on the projected position on the light beam. The desired data is recorded by switching the polarity of the modulating magnetic field in correspondence to the recording data, thus applying the thermomagnetic recording scheme.

As will be explained further herein, when the optical disc 2 is read using the present invention, the system control circuit 9 checks a vendor unique data which is recorded in the optical disc 2 and reproduces the user data in each sector, whereby an illegal copying of the user data allocated to each sector can be effectively avoided.

In the optical disc 2, the recording region is divided into sectors, and the data is recorded in each sector according to the format which is shown in FIG. 2.

This format has been established by ISO (International Standards Organization) with respect to optical discs with a diameter of 3.5 inches, and one sector is formed by 525 bytes data.

Each sector is formed in such a manner that 512 bytes, D0 to D511, are allocated to the user data and the succeeding 4 bytes, VU1 to VU4, are allocated to the vendor unique data.

Further, each sector is formed in such a manner that 5 bytes, CRC1 to CRC4, are allocated to the parity code and the residual 5×16 bytes of E1, 1 to E5, 16 are allocated to the error detecting and correcting code.

When a read command is issued via the SCSI interface circuit 12, the data is reproduced sector by sector. The 512 bytes data which has been allocated to the user data, of the 525 bytes data of one sector, goes through the error detecting and correcting process and is then output.

Figure 3:
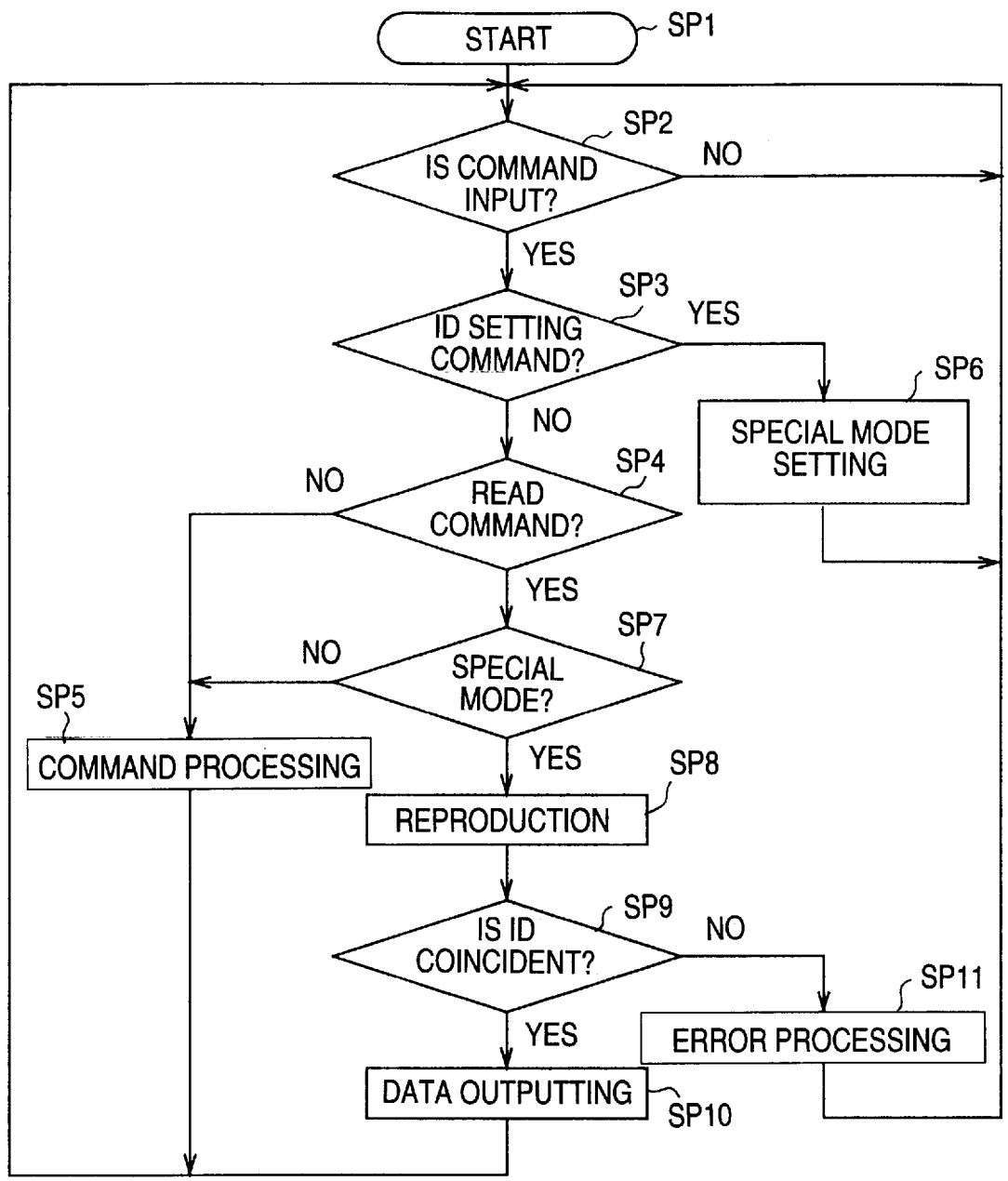
FIG. 3 is a flow chart explaining the first embodiment of this invention.

In the present embodiment, the procedure shown in FIG. 3 is performed and the vendor unique data is checked, so as to effectively avoid illegal copying.

At first, the system control circuit 9 proceeds from step SP1 to step SP2, and determines whether or not a command has been input from the host computer.

If a negative result is obtained here, the system control circuit 9 repeats this step SP2. If an affirmative result is obtained, it proceeds to step SP3 to determine whether or not that command is a command for setting the vendor ID.

Here, a unique ID code is set in an application program for reproducing the data which is stored in the optical disc 2. Moreover, the unique ID code is set to the vendor ID which is then recorded in the vendor unique area of each sector.

The application program which retrieves the data stored in this optical disc 2 issues an ID setting command to set the ID data which corresponds to the vendor ID. In addition, this ID data is stored in a memory (not shown) in the system control circuit 9.

More specifically, the system control circuit 9 determines whether or not the code issued from the host computer is an ID setting command. If a negative result is obtained at step SP3, the system control circuit 9 proceeds to step SP4 to judge whether or not the command is a read command.

If a negative result is obtained at step SP4, it proceeds to step SP5 to perform the command processing corresponding to the control command, and then returns to step SP2.

Here, the command processing represents the processing other than the ID setting command and the read command at special mode, which is, for example, the processing for write command, request sense command to examine an error status, and so on.

On the other hand, if an affirmative result is obtained at step SP3, the system control circuit 9 proceeds to step SP6 to set the operation mode to the special mode, and then analyze the ID code which has been supplied with the ID setting command, to set the comparing ID.

In the optical disc device 1, the comparing ID is set based on the ID code which is set in the application program supplied from the host computer.

When the operation mode is set to the special mode, processing returns to step SP2.

In the case where a read command has been supplied from the host computer, an affirmative result is obtained at step SP4, and processing proceeds to step SP7.

Here, the system control circuit 9 judges whether or not the current operation mode is the special mode. If not, it proceeds to step SP5 to reproduce the user data which is assigned by the read command, and then returns to step SP2.

On the other hand, if the read command has been input in such a state that the system control circuit 9 has been set to the special mode, it proceeds to step SP8 to reproduce the sector which is assigned by the read command.

The system control circuit 9 subsequently proceeds to step SP9, and the error correction process of the reproduced vendor unique area data is performed to detect the vendor ID, and then, by performing the specified logical operation process between the vendor ID and the comparing ID, it is determined whether or not the vendor ID coincides with the comparing ID.

Here, when the reproduced vendor ID coincides with the comparing ID, this means that the read command for the optical disc has been issued by the application program corresponding to the optical disc 2. Therefore, the system control circuit 9 proceeds to step SP10 to output the reproduced user data to the host computer.

On the other hand, when the reproduced vendor ID does not coincide with the comparing ID, this means that the read command has been issued to the optical disc 2 by an application program which does not correspond to the optical disc 2.

If the negative result is obtained at step SP9, the system control circuit 9 proceeds to step SP11 to generate data representing that an error has occurred, and then proceeds to step SP2. Therefore, the process which is corresponding to the read command is terminated, without outputting of the reproduced user data to the host computer.

In this manner, in the optical disc device 1, only when the read command has been issued from the application program corresponding to the optical disc 2 can the user data be output. Thereby, illegal copying can be prevented. Illegal copying is effectively avoided because the reproduced data is not output to the outside of the optical disc device 1.

Note that in this type of an optical disc device 1, the data recorded in the vendor unique area is controlled only in the optical disc device 1, and is not accessible from the outside of the optical disc device 1. Therefore, even if the user data is copied by some method, the data of the vendor unique area is not copied. The copy seems to be completed normally. However, if an attempt is made to reproduce the copied user data from the optical disk, the reproduced user data is not output to the outside of the optical disc device 1, i.e. to the host computer, since the vendor ID and the comparing ID are not coincident. Therefore, an illegal copy can be avoided.

Next, another embodiment of this invention will be described with reference to FIGS. 4 to 6.

In this embodiment, a logical sector of the optical disc 2 is regenerated based on the vendor ID which is allocated to the vendor unique area, so that the illegal copy is effectively avoided.

Figure 4:
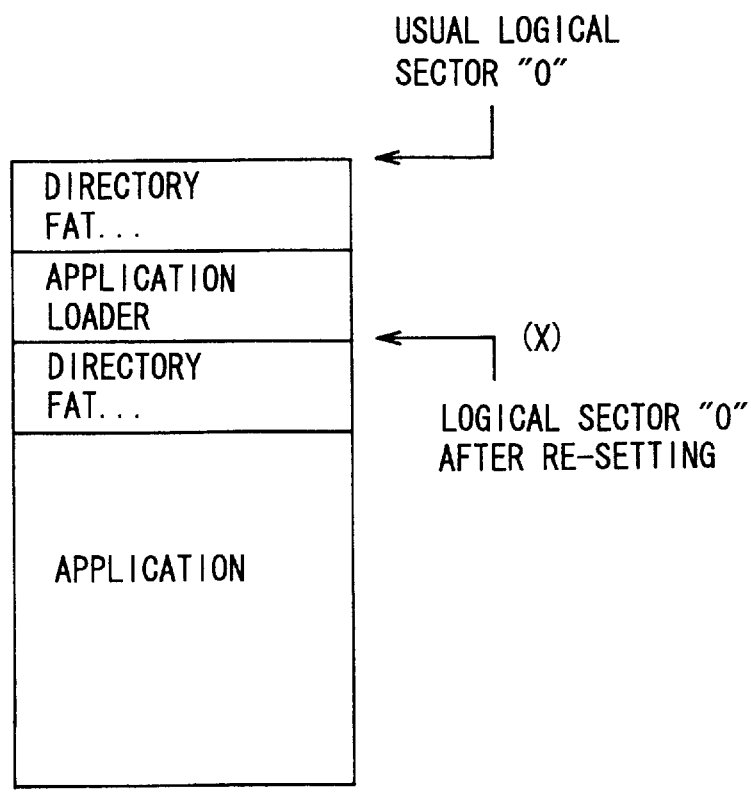
FIG. 4 is a schematic diagram explaining an optical disc which is applied to the second embodiment of this invention.

In this embodiment, as shown in FIG. 4, the head sector, the directory data, the file allocation table (FAT), etc. are recorded in the optical disc 2, and the file of the application loader is sequentially recorded in the optical disc 2.

Following to the file of the application loader: the directory data, the file allocation table (FAT), and the subsequent file of the application program are recorded in the optical disc 2.

Figure 5:
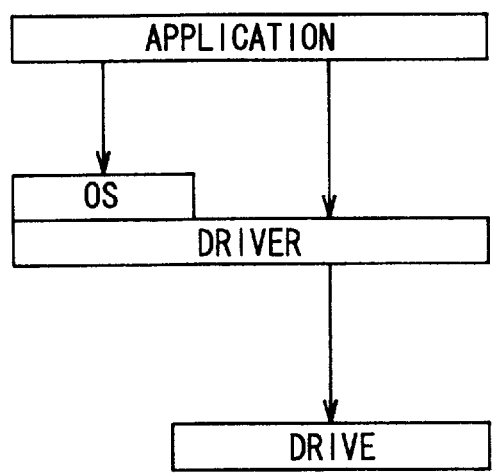
FIG. 5 is a schematic diagram explaining the operation of the optical disc device according to the second embodiment of this invention.
Figure 6:
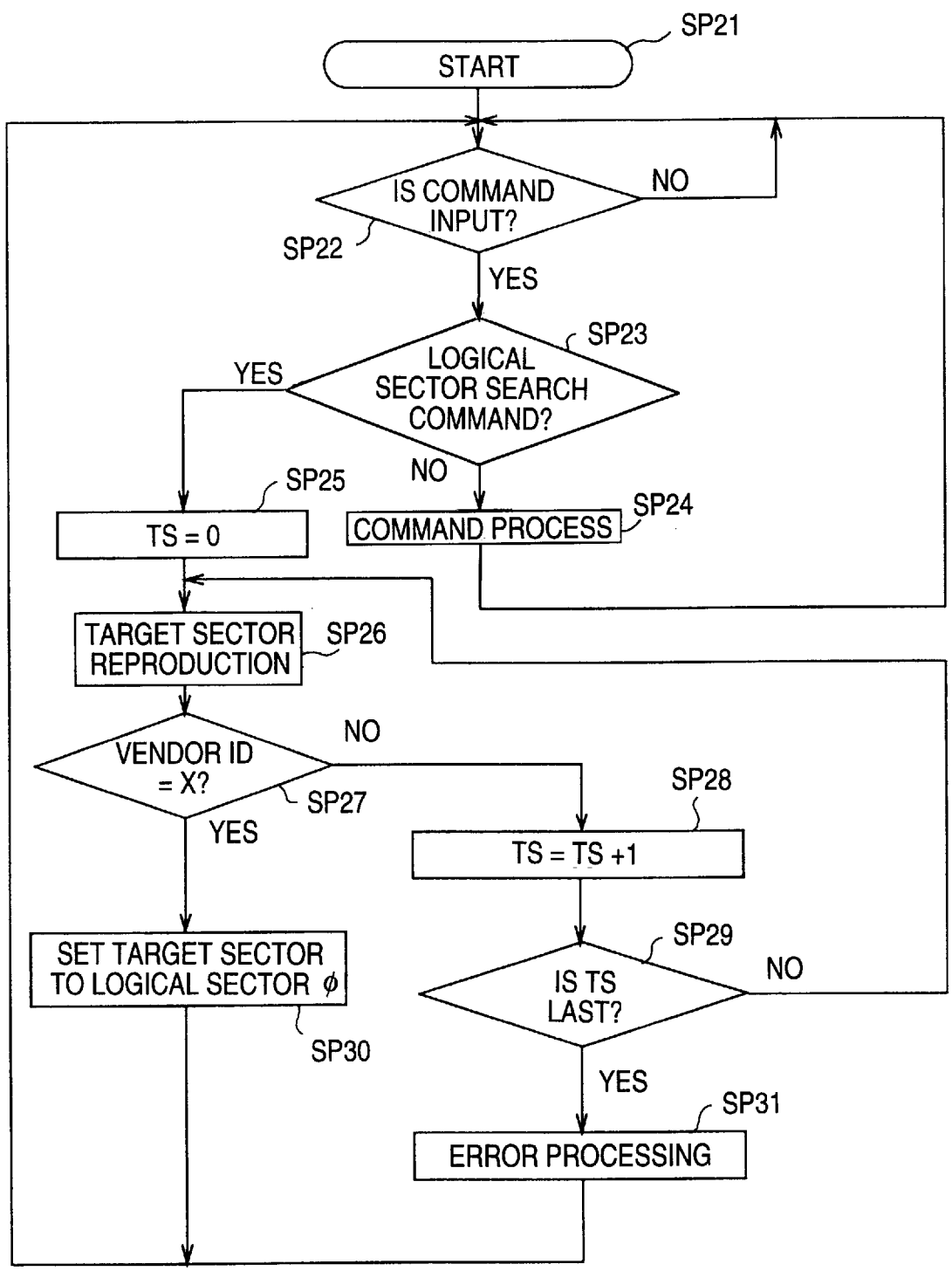
FIG. 6 is a flow chart explaining the second embodiment of this invention.

As shown in FIG. 5, when an application program starts-up in the same way as a conventional optical disc, the operating system (OS) of the host computer first issues a command for reproduction from the logical sector "0" of the drive, so that the directory data and the file allocation table which have been placed on the head sector are accessed, and the succeeding application loader is loaded to the host computer.

In addition, the position of the logical sector "0" is detected by accessing the management data (DDS: Disc Definition Structure) recorded in the innermost periphery of the optical disc 2.

In a conventional optical disc device, the processing of the application program starts based upon the application loader which has been loaded into the host computer. On the other hand, in this embodiment the procedure shown in FIG. 6 is performed in response to the command which is issued by the application loader.

The processing shown in FIG. 6 will be described hereinafter.

First, it proceeds from step SP21 to step SP22 to judge whether or not a command has been input from the host computer.

If a negative result is obtained, the system control circuit 9 repeats step SP22. If an affirmative result is obtained, the system control circuit 9 proceeds to step SP23 to judge whether or not the command is a logical sector search.

If a negative result is obtained, the system control circuit 9 proceeds to step SP24 to perform the processing which corresponds to the control command, and then returns to step SP22.

On the other hand, in the case where a logical sector search command is issued from the host computer, the system control circuit 9 proceeds to the following step SP25 to set the target sector (TS) to the logical sector "0" written in the DDS, and then proceeds to step SP26 to reproduce the sector of this logical sector Then, the system control circuit 9 takes the data of the vendor unique area out of the reproduced result.

Here, in such an optical disc 2, the data of the vendor unique area is processed only in the drive, and the content of this data can not be accessed externally.

Utilizing this characteristic of the vendor unique area, the data of a predetermined value X is recorded into the vendor unique area of the sector which is reset to be logical sector 11011 on the optical disc 2, and a vendor ID of a value other than X is recorded for the residual sectors.

Consequently, the system control circuit 9 takes the data of the vendor unique area from the sector of the logical sector "0", and proceeds to step SP27 to judge whether or not the vendor ID obtained from the data of the taken vendor unique area is the predetermined value X. If a negative result is obtained, it proceeds to step SP28.

At step SP28, the system control circuit 9 increments the value of the target sector TS by one, and then proceeds to step SP29 to judge whether or not the target sector TS is the last sector.

If a negative result is obtained, it returns to step SP26 to reproduce the following sector.

The system control circuit 9 thus repeats the procedure of steps SP26–SP27–SP28–SP29–SP26 sequentially, and if a vendor ID of the value X is detected, it proceeds to step SP30.

At this point, the system control circuit 9 resets the sector where the vendor ID of the value X was found to be the logical sector "0", and returns to step SP22.

When a command is subsequently issued from the application loader, the system control circuit 9 reproduces and outputs the directory data and the file allocation table based on the logical sector which has been reset and further reproduces and outputs the application program which follows.

At this time, an operation system of the host computer is able to operate, independently of the resetting of the logical sector, in the same manner as the case where an application program is executed with respect to a conventional optical disc.

On the other hand, in the case where the vendor ID of the value X can not be found, the last sector is reached and the system control circuit 9 proceeds to step SP31.

At this point, the system control circuit 9 generates the data representing that an error has occurred, and then returns to step SP22.

In the optical disc device 1, with respect to an optical disc which is obtained by illegally copying the user data, at reproducing, the vendor ID of the value X can not be detected for the reason that the copying of the vendor unique area is impossible. Therefore, it is difficult to start-up this application program normally.

Consequently, the illegal copy can be effectively avoided.

In the first embodiment described above, the logical operation is performed and the judgment upon whether or not the vendor ID coincides with the comparing ID is formed. However, this invention is not only limited to this but, the various logical operations may be performed between the vendor ID and the comparing ID, and the judgment upon whether or not the predetermined results of the operations are obtained is formed.

Further, in this invention, the data of the vendor unique is referred to determine the type of user data, and the important data is changed if necessary.

Figure 7:
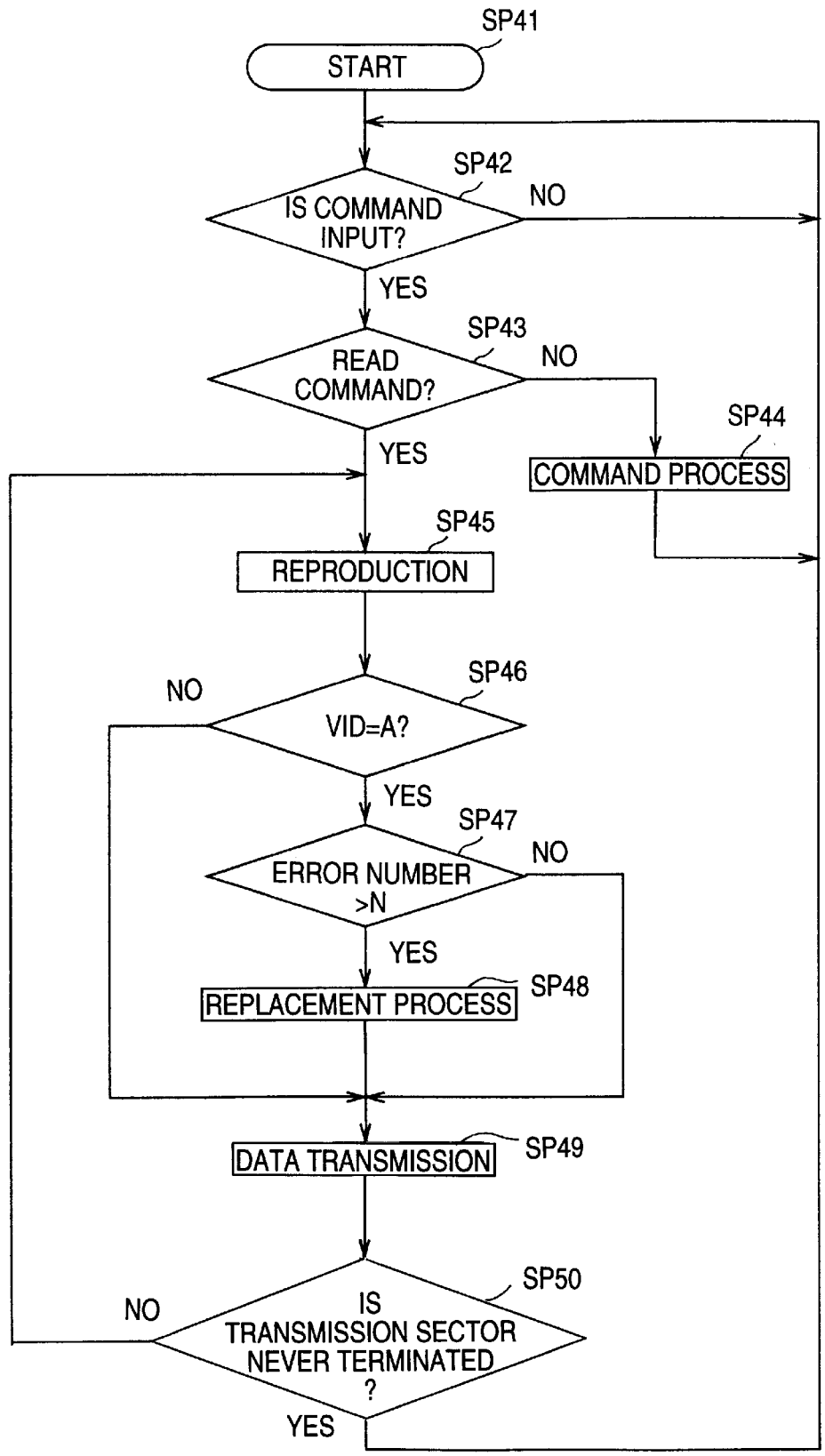
FIG. 7 is a flow chart explaining the third embodiment of this invention.

In FIG. 7, the system control circuit 9 proceeds from step SP41 to step SP42 to judge whether or not a command has been input from the host computer.

If a negative result is obtained, the system control circuit 9 repeats step SP42. On the contrary, if an affirmative result is obtained, the system control circuit 9 proceeds to step SP43 to judge whether or not the input command is a read command.

If a negative result is obtained, the system control circuit 9 proceeds to step SP44 where the processing corresponding to a control command is performed, and then it returns to step SP42.

On the other hand, if a read command is input the system control circuit 9 proceeds to step SP45 to reproduce the sector specified by the host computer.

Continuously, the system control circuit 9 proceeds to step SP46 to detect the data of the vendor unique area of the reproduced sector, and the specific logical calculation processing is performed between the data of this vendor unique area and a predetermined value A to judge whether or not the data of this vendor unique area is the predetermined value A.

In a conventional device, the important data such as the DDS is recorded in more than two places on an optical disc. In this invention, in contrast, the predetermined value A is recorded in the data of the vendor unique area of the important data, such as the DDS. Also in this invention, the important data can be recorded in more than two places, the same as in a conventional device.

In step SP46, when the data of the vendor unique area is the predetermined value A, the system control circuit 9 proceeds to step SP47. Here, the error detecting and correcting circuit 11 obtains the information representing how many errors there are at error correcting processing, and then supplies this information to the system control circuit 9.

The system control circuit 9 judges at step SP47 whether or not the error number per sector is over a reference value N, and if an affirmative result is obtained, it proceeds to step SP48 to perform replacement processing.

The replacement process is to record the error corrected data from the vendor unique area in the replacement sector formed at another position on the optical disc.

In addition, this reference value N is set lower than the reference value for the replacement processing that is performed on normal data such as user data. Therefore, the important data, such as the DDS, is more likely to be replacement processed.

Here, in the 3.5 inch optical disc 2 provided by ISO, a bit error rate under 40 bytes per sector can be corrected for a burst type bit error and, further, a bit error rate under 8 bytes can be corrected for a bit error rate of one column of data (note in FIG. 2, the sequential column data in the vertical direction is composed of D0, D5,...D510).

On the contrary, in this embodiment, if a burst type bit error rate over 20 bytes occurs, or if a bit error rate of one column of data over 4 bytes occurs, the replacement processing is performed, so that the replacement processing is automatically performed with a lower bit error rate than the normal user data. Thus, the important data is more likely to be reproduced.

Therefore, the host computer can surely access. this type of important data so as to access the mass of files recorded on the optical disc 2.

In this way, the system control circuit 9 performs the replacement processing, and proceeds to step SP49 to output the data of the reproduction sector stored in the buffer memory 13 to the host computer.

On the other hand, if a negative result is obtained at step SP46, the system control circuit 9 proceeds to step SP49 to output the data of the reproduction sector stored in the buffer memory 13 to the host computer, and then the system control circuit 9 proceeds to step SP50.

Further, when the reproduced data is stored in the buffer memory 13 to output to the host computer, the data in the directory which is frequently accessed on the basis of the data of the vendor unique area is stored and held in a predetermined area of a different buffer memory 13 separate from the general user data. If the command to access this data is issued from the host computer, the data stored in the buffer memory 13 is output to the host computer without accessing the optical disc 2.

In this way, the data in the directory which is frequently accessed on the basis of the data of the vendor unique area uses the buffer 13 as a cache memory. Thus, the transmission time can be shortened to reduce the access time.

In this way, the data is transmitted to the host computer, and the system control circuit 9 proceeds to step SP50 to judge whether or not the user data is transmitted for the sector number specified by the host computer. At step SP50, if a negative result is obtained, the system control 9 returns to step SP45 to reproduce the next sector. If an affirmative result is obtained, it returns to step SP42 to await the input of the next command.

With the above construction, the important user data is replacement processed at a time when the error number is less than that of the general user data on the basis of the data of the vendor unique area, so that the important data can be held to be reproducible at all times. Also, the caching is performed on the user data which is accessed frequently on the basis of the data of the vendor unique area, so as to shorten the access time.

Figure 8:
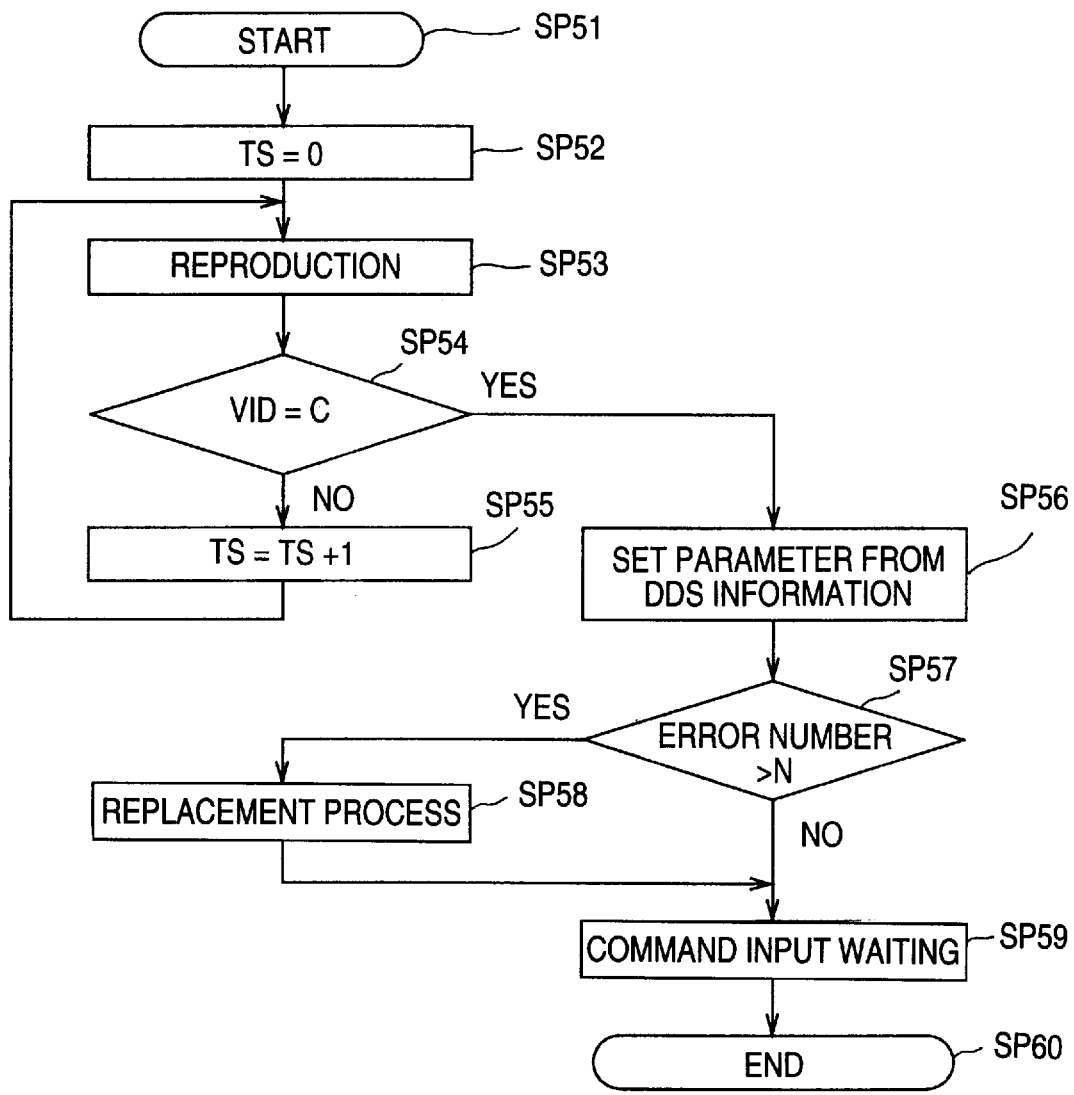
FIG. 8 is a flow chart explaining the fourth embodiment of this invention.

Next, another embodiment of this invention will be described with reference to FIG. 8.

The DDS above is recorded at the innermost and outermost sectors of the optical disc 2. The procedure shown in FIG. 8 is Performed on power up resetting, or loading the optical disc 2, so that the DDS is retrieved on the basis of the data of the vendor unique area.

More specifically, when the power is turned on, resetting is performed, or the optical disc 2 is loaded, the system control circuit 9 proceeds from step SP51 to step SP52 to set the logical sector of the target sector representing the object to be reproduced to the value "0".

Further the system control circuit 9 proceeds to step SP53 to reproduce the target sector of this logical sector "0". Thereafter, the predetermined calculation processing is performed on a data VID of the vendor unique area of the reproduced sector, and then it is judged whether or not this data VID is a predetermined value C.

In this embodiment, the data VID in the second unique area is set to a predetermined value C for the sector in which construction data for the optical disc 2 is recorded so that the construction data is as easily identifiable as other data.

If a negative result is obtained at step SP54, the system control circuit 9 proceeds to step SP55 to increment the logical sector of the target sector by the value "1", and then returns to step SP53.

The system control circuit 9 repeats the procedure of steps SP53–SP54–SP55–SP53 so as to reproduce the sectors of the optical disc 2 sequentially from the logical sector "0" and retrieve the sector in which the construction data is recorded.

In this way, after the sector in which the construction data is recorded is reproduced, if an affirmative result is obtained at step SP54, the processing proceeds to step SP56 to set a parameter for detecting the replacement sector, etc., based on the construction data (that is, the information of the DDS) recorded in this sector.

Hence, the optical disc 2 is accessed based on the set parameter so the desired user data can be recorded in the optical disc 2 and the data recorded in the optical disc 2 can be also reproduced.

After the construction data is reproduced, the system control circuit 9 proceeds to step SP57 to judge that whether or not the number of errors during reproduction of the construction data is over a predetermined value N on the basis of the processing result of the error detecting and correcting circuit 11.

If an affirmative result is obtained at step SP57, the system control circuit 9 proceeds to step SP58 to perform replacement processing on the sector in which the construction data is recorded, and then it proceeds to step SPS9. If a negative result is obtained, it proceeds to step SP59 directly.

The system control circuit 9 outputs a control code to the buffer control circuit 10, etc., and re-records the construction data stored in the buffer memory 13 just after reproduction of the replacement sector of the optical disc 2.

If a defect occurred in the sector of the construction data and the error rate deteriorated, the replacement processing is performed and the construction data is recorded in a form that is surely reproducible.

In this way, the system control circuit 9 performs replacement processing and then proceeds to step SP59 to change the command state to input waiting. Thereafter, the process proceeds to step SP60 to terminate the procedure.

With the above constitution, the construction data can be identified on the basis of the data of the vendor unique area, and replacement processing is performed, if necessary, to store this construction data so that it is certain to be reproducible. Therefore, the reliability of the optical disc device can be improved.

What is claimed is:

1. A disc driving apparatus for driving a disc recording medium on which a vendor unique data which can not be output to outside the disc driving apparatus and a user data are recorded together in each of a plurality of sectors, said disc driving apparatus comprising:

reproducing means for reproducing said vendor unique data and said user data recorded on said disc recording medium in each sector;

buffer memory means for temporarily storing the user data reproduced by said reproducing means;

interface means for outputting the user data to outside the disc driving apparatus;

identification data storing means for storing an identification data which is peculiar to the disc driving apparatus;

detection means for detecting whether or not the vendor unique data reproduced by said reproducing means is coincident with said identification data; and control means for preventing outputting of the user data from said interface means to outside the disc driving apparatus when said detection means detects that the vendor unique data is not coincident with said identification data.

2. The disc driving apparatus according to claim 1, wherein said detection means detects that said vendor unique data is coincident with said identification data when the result of the predetermined calculation processing for said vendor unique data and said identification data becomes the predetermined value.

3. A data reproducing apparatus for reproducing a data signal recorded on a recording medium wherein, said data signal includes at least a vendor unique data which can not be output outside the reproducing apparatus and a user data and is recorded in each sector, said data reproducing apparatus comprising:

reproducing means for reproducing said vendor unique data and said user data recorded on said recording medium in each sector;

buffer memory means for temporarily storing the user data reproduced by said reproducing means;

interface means for outputting the user data to outside the reproducing apparatus;

identification data storing means for storing an identification data which is peculiar to the reproducing apparatus;

detection means for detecting whether or not the vendor unique data reproduced by said reproducing means is coincident with said identification data; and control means for preventing outputting of the user data from said interface means to outside the data reproducing apparatus when said detection means detects that the vendor unique data is not coincident with said identification data.

4. The data reproducing apparatus according to claim 3, wherein said detection means detects that said vendor unique data is coincident with the identification data when the result of the predetermined calculation processing for said vendor unique data and said identification data becomes the predetermined value.

5. A method for preventing outputting of a user data, which is recorded on a recording medium by duplicating from another recording medium, from a data reproducing apparatus for reproducing the user data comprising the steps of:

(a) reproducing a vendor unique data and said user data recorded on each sector of said recording medium;

(b) temporarily storing the user data reproduced in step (a);

(c) detecting whether or not the vendor unique data reproduced in step (a) is coincident with an identification data; and (d) preventing outputting of the user data from the data recording apparatus when the vendor unique data is not coincident with said identification data.

\* \* \* \* \*